United States Patent
Hall et al.

(10) Patent No.: US 7,265,649 B1
(45) Date of Patent: Sep. 4, 2007

(54) FLEXIBLE INDUCTIVE RESISTIVITY DEVICE

(76) Inventors: David R. Hall, 2185 S. Larsen Pkwy., Provo, UT (US) 84606; Paula Turner, 2185 S. Larsen Pkwy., Provo, UT (US) 84606; Christopher Durrand, 2185 S. Larsen Pkwy., Provo, UT (US) 84606; Joe Fox, 2185 S. Larsen Pkwy., Provo, UT (US) 84606; Tyson J. Wilde, 2185 Larsen Pkwy., Provo, UT (US) 84606

( * ) Notice: Subject to any disclaimer, the term of this patent is extended or adjusted under 35 U.S.C. 154(b) by 0 days.

(21) Appl. No.: 11/676,494

(22) Filed: Feb. 19, 2007

(51) Int. Cl.
*H01F 27/02* (2006.01)
(52) U.S. Cl. .................................................. 336/84 M
(58) Field of Classification Search ................ 336/83, 336/84 R, 84 M, 90–96, 107, 233; 166/242.5, 166/65.1, 380; 340/853.3–853.7
See application file for complete search history.

(56) References Cited

U.S. PATENT DOCUMENTS

| | | | |
|---|---|---|---|
| 4,278,556 A | 7/1981 | Tada | |
| 4,563,714 A | 1/1986 | Takeuchi | |
| 4,766,384 A | 8/1988 | Kleinberg | |
| 4,881,988 A | 11/1989 | Bonser | |
| 5,138,263 A | 8/1992 | Towle | |
| 5,491,488 A | 2/1996 | Wu | |
| 5,530,358 A | 6/1996 | Wisler | |
| 6,114,972 A | 9/2000 | Smith | |
| 6,191,586 B1 | 2/2001 | Bittar | |
| 6,218,842 B1 | 4/2001 | Bittar et al. | |
| 6,259,030 B1 | 7/2001 | Tanigawa et al. | |
| 6,285,014 B1 * | 9/2001 | Beck et al. | 219/644 |
| 6,297,639 B1 | 10/2001 | Clark | |
| 6,344,746 B1 | 2/2002 | Chunduru et al. | |
| 6,359,438 B1 | 3/2002 | Bittar | |
| 6,538,447 B2 | 3/2003 | Bittar | |
| 6,577,129 B1 | 6/2003 | Thompson et al. | |
| 6,630,831 B2 | 10/2003 | Amini | |
| 6,646,441 B2 | 11/2003 | Thompson et al. | |
| 6,677,756 B2 | 1/2004 | Fanini et al. | |
| 6,703,837 B1 | 3/2004 | Wisler et al. | |
| 6,765,385 B2 | 7/2004 | Sinclair et al. | |
| 6,777,940 B2 | 8/2004 | Macune | |
| 6,810,331 B2 | 10/2004 | Bittar et al. | |
| 6,814,162 B2 | 11/2004 | Moran et al. | |
| 6,849,195 B2 | 2/2005 | Basheer et al. | |
| 6,900,640 B2 | 5/2005 | Fanini | |
| 6,913,095 B2 | 7/2005 | Krueger et al. | |
| 6,915,701 B1 | 7/2005 | Tarler | |
| 7,031,839 B2 | 4/2006 | Tabarovsky et al. | |

(Continued)

*Primary Examiner*—Tuyen T. Nguyen
(74) *Attorney, Agent, or Firm*—Tyson J. Wilde

(57) ABSTRACT

In one aspects of the present invention, an induction resistivity tool incorporated into a downhole tool string comprises a downhole tool string component comprising a mid-body intermediate first and second tool joints adapted for connection to adjacent tool string components. The mid-body comprises a central bore formed within a tubular wall of the component, the tubular wall comprising an inner and outer diameter. At least one annular radial recess is formed in the outer diameter of the mid-body and comprises a coil adapted to transceive induction signals outwardly from the mid-body, and at least one flexible ring of magnetically conducting material is disposed intermediate the coil and a surface of the recess and arranged within the annular radial recess such that it filters a range of frequencies of the induction signals.

20 Claims, 9 Drawing Sheets

U.S. PATENT DOCUMENTS

| | | |
|---|---|---|
| 7,040,003 B2 | 5/2006 | Hall et al. |
| 7,064,676 B2 | 6/2006 | Hall et al. |
| 7,091,810 B2 | 8/2006 | Hall et al. |
| 7,116,199 B2 | 10/2006 | Hall et al. |
| 2004/0113626 A1 | 6/2004 | Wang et al. |
| 2006/0158296 A1 | 7/2006 | Hall |
| 2006/0197629 A1 | 7/2006 | Pivit et al. |
| 2006/0208383 A1 | 9/2006 | Aisenbrey |

* cited by examiner

FLEXIBLE INDUCTIVE RESISTIVITY DEVICE

BACKGROUND OF THE INVENTION

The present invention relates to the field of downhole oil, gas, horizontal, and/or geothermal exploration and more particularly to the field of resistivity tools for tool strings employed in such exploration.

For the past several decades, engineers have worked to develop apparatus and methods to effectively obtain information about downhole formations, especially during the process of drilling. Logging-while-drilling (LWD) refers to a set of processes commonly used by the industry to obtain information about a formation during the drilling process in order to transmit the information from components located downhole on oil and gas drilling strings to the ground's surface. Various sensors and methods have been developed to obtain and transfer formation information to the surface. Due to the extreme conditions present in downhole environments, sensors must be used that can withstand great stresses.

Part of the difficulty comes from the fact that the operating environment can be extremely harsh, including temperatures as high as 200° C., pressures as high as 25,000 psi, and extremely abrasive and chemically corrosive conditions. Another source of difficulty comes from the fact that a drill string is made up of hundreds of components, such as sections of drill pipe and various downhole tools. Since these components are connected serially to create a drill string that may stretch for thousands of feet below the earth's surface, reliability is imperative. A failure in any essential downhole component can bring the whole system down and require an expensive "roundtrip" of the drill string to replace the defective component.

The prior art contains references to drill bits with sensors or other apparatus for data retrieval.

U.S. Pat. No. 6,814,162 to Moran, et al. which is incorporated by reference for all that it contains, discloses a drill bit, comprising a bit body, a sensor disposed in the bit body, a single journal removably mounted to the bit body, and a roller cone rotatably mounted to the single journal. The drill bit may also comprise a short-hop telemetry transmission device adapted to transmit data from the sensor to a measurement-while-drilling device located above the drill bit on the drill string.

U.S. Pat. No. 6,913,095 to Krueger, which is incorporated by reference for all that it contains, discloses a closed-loop drilling system that utilizes a bottom hole assembly ("BHA") having a steering assembly having a rotating member and a non rotating sleeve disposed thereon. The sleeve has a plurality of expandable force application members that engage a borehole wall. A power source and associated electronics for energizing the force application members are located outside of the non rotating sleeve.

U.S. Pat. No. 5,138,263 to Towle, which is incorporated by reference for all that it contains, discloses a tool for evaluating electrical properties of an earth formation surrounding a borehole while drilling the borehole by electromagnetically coupling antennas with the formation.

U.S. Pat. No. 6,677,756 to Fanini, et al. which is incorporated by reference for all that it contains, discloses an induction tool for formation resistivity evaluations. The tool provides electromagnetic transmitters and sensors suitable for transmitting and receiving magnetic fields in radial directions.

U.S. Pat. No. 6,630,831 to Amini, which is incorporated by reference for all that it contains, discloses an invention that uses inductive magnetic coup ling of electromagnetic waves to EM barrier materials in combination with transmission of electromagnetic waves through non-permeable material to facilitate the measurement of resistivity of geologic formation beyond the well casing.

U.S. Pat. No. 6,577,129 to Thompson, et al. which is incorporated by reference for all that it contains, discloses an electromagnetic wave propagation resistivity borehole logging system comprising multiple groups of electromagnetic transmitter-receiver arrays operating at three frequencies.

U.S. Pat. No. 6,538,447 to Bittar, which is incorporated by reference for all that it contains, discloses a multi-mode resistivity tool for use in a logging-while-drilling system that includes an asymmetric transmitter design with multiple transmitters capable of generating electromagnetic signals at multiple depths of investigation.

U.S. Pat. No. 6,359,438 to Bittar, which is incorporated by reference for all that it contains, discloses a resistivity tool for use in an LWD system that includes a transmitter array with multiple transmitters positioned above a pair of receivers. The transmitters are selectively energized, causing current to be induced in the collar of the tool.

US Patent Application Publication No. 2006/0186888 to Wang, et al, which is incorporated by reference for all that it contain, discloses a measurement-while-drilling method and apparatus for determining the azimuth of providing magnetic field in a remote formation layer in the vicinity of a down hole resistivity tool. Coils are placed on the tool body having an external surface and a plurality of grooves are cut in the external surface of the tool body and oriented substantially horizontally with respect to the longitudinal axis of the tool body for the coils. Ferrite materials may be inserted in the grooves in between the coil wire and the bottom of the grooves.

U.S. Pat. No. 7,116,199 to Hall, et al, which is incorporated by reference for all that it contains, discloses an inductive coupler for downhole components. The inductive coupler includes an annular housing having a recess defined by a bottom portion and two opposing side wall portions. A plurality of generally U-shaped magnetically conductive electrically insulating segments, preferably comprised of ferrite, are disposed in the recess and aligned so as to form a circular trough.

BRIEF SUMMARY OF THE INVENTION

In one aspect of the invention, an induction resistivity tool incorporated into a downhole tool string comprises a downhole tool string component comprising a mid-body disposed intermediate first and second tool joints adapted for connection to adjacent tool string components. The mid-body comprises a central bore formed within a tubular wall of the component, the tubular wall comprising an inner and outer diameter. At least one annular radial recess is formed in the outer diameter of the mid-body and comprises a coil adapted to transceive induction signals outwardly from the mid-body, and at least one flexible ring of magnetically conducting material is disposed intermediate the coil and a surface of the recess and arranged within the annular radial recess such that it filters a range of frequencies of the induction signals.

The resistivity tool may comprise a sleeve adapted to protect the coil, groove, or flexible ring from mud and/or debris. The resistivity tool may be incorporated into a bottom hole assembly, and may be in communication with a downhole network. In some embodiments the coil may comprise between 1 and 15 turns of coil. The coil may be separated from the outer diameter by insulating material.

The flexible ring of magnetically conducting material may comprise segments of ferrite joined flexibly together with a flexible backing. Adjacent segments of ferrite may be connected by the use of an adhesive, frame, brace, hinge, tie, string, tape, or combinations thereof. In some embodiments the flexible ring may comprise a flexible matrix filled with a magnetically conductive material The flexible ring may comprise a generally circular trough geometry, a generally cylindrical geometry, a dual trough geometry, or combinations thereof. In embodiments where the flexible ring comprises a circular trough geometry, a segment of the circular trough may comprise a bottom end, two sides and an open end defined by a plane comprising a distal end of each of the sides. The plane of the open end may be generally parallel to a longitudinal surface of the inner diameter of the tubular wall. Alternatively, the plane of the open end may form an angle of between 1 and 89 degrees with a longitudinal surface of the inner diameter of the tubular wall. The radial recess may comprise at least two flexible rings tilted at different angles.

The flexible ring may comprise a material selected from the group consisting of soft iron, ferrite, a nickel alloy, a silicon iron alloy, a cobalt iron alloy, a mu-metal, a laminated mu-metal, barium, strontium, carbonate, samarium, cobalt, neodymium, boron, a metal oxide, ceramics, cermets, ceramic composites, rare earth metals, an aerogel composite, polymers, organic materials, thermoset polymers, vinyl, a synthetic binder, thermoplastic polymers, an epoxy, natural rubber, fiberglass, carbon fiber composite, polyurethane, silicon, a fluorinated polymer, grease, polytetrafluoroethylene, a perfluororoalkoxy compound, resin, potting material, and combinations thereof. The flexible ring may comprise at least two flexibly attached segments that are adapted to allow the flexible ring to open and close. In some embodiments the flexible ring may comprise one continuous piece.

The magnetically conductive material may comprise a relative magnetic permeability range of between 100 and 20000. The magnetically conductive material may comprise ferrite in the form of fibers, strips, shavings, powder, crystals, formed pieces or combinations thereof. The induction resistivity tool may comprise a plurality of coils in the same radial recess or in a plurality of radial recesses. Each coil may be selectively energized.

DETAILED DESCRIPTION OF THE INVENTION AND THE PREFERRED EMBODIMENT

Figure 1:
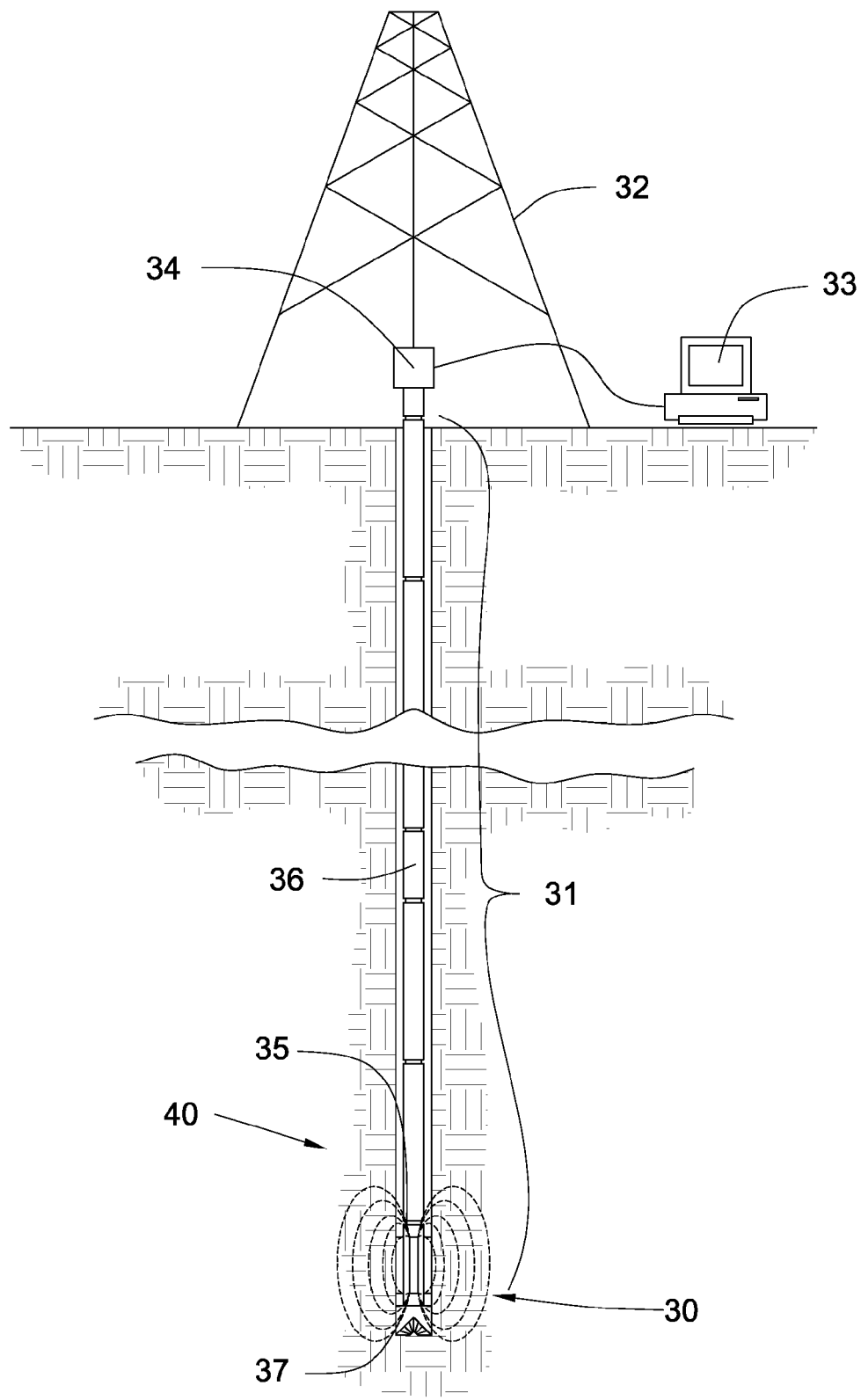
FIG. 1 is a cross-sectional diagram of an embodiment of a downhole tool string.

Referring now to FIG. 1, a downhole tool string 31 may be suspended by a derrick 32. The tool string may comprise one or more downhole components 36, linked together in a tool string 31 and in communication with surface equipment 33 through a downhole network. Having a network in the tool string 31 may enable high-speed communication between each device connected to it and facilitate the transmission and receipt of data between sensors, energy sources, and energy receivers.

The tool string 31 or surface equipment 33 may comprise an energy source or multiple energy sources. The energy source may transmit electrical current to one or more downhole components 36 on the bottom hole assembly 37 or along the tool string 31. In some embodiments of the invention, one or more downhole component 36 may comprise sensors. These sensors may sense gamma rays, radioactive energy, resistivity, torque, pressure, or other drilling dynamics measurements or combinations thereof from the formation being drilled. Any combination of downhole components 36 in a tool string 31 may be compatible with the present invention. In some embodiments of the invention the drill string 31 may comprise an energy source that is radioactive or emits subatomic particles, such as gamma ray or neutron sources. The neutron source may comprise an Americium Beryllium source or it may comprise a pulsed neutron generator which uses deuterium and/or tritium ions. Data may be transmitted up and down the tool string 31 and between different tool components 36.

Data may be transmitted along the tool string 31 through techniques known in the art. A preferred method of downhole data transmission using inductive couplers disposed in tool joints is disclosed in the U.S. Pat. No. 6,670,880 to Hall, et al, which is herein incorporated by reference for all it discloses. An alternate data transmission path may comprise direct electrical contacts in tool joints such as in the system disclosed in U.S. Pat. No. 6,688,396 to Floerke, et al., which is herein incorporated by reference for all that it discloses. Another data transmission system that may also be adapted for use with the present invention is disclosed in U.S. Pat. No. 6,641,434 to Boyle, et al., which is also herein incorporated by reference for all that it discloses. In some embodiments, of the present invention alternative forms of telemetry may be used to communicate with the downhole components 36, such as telemetry systems that communicate through the drilling mud or through the earth. Such telemetry systems may use electromagnetic or acoustic waves. The alternative forms of telemetry may be the primary telemetry system for communication with the tool string 31 or they may be back-up systems designed to maintain some communication if the primary telemetry system fails.

A data swivel 34 or a wireless top-hole data connection may facilitate the transfer of data between components 36 of the rotatable tool string 31 and the stationary surface equipment 33. Downhole tool string components 36 may comprise drill pipes, jars, shock absorbers, mud hammers, air hammers, mud motors, turbines, reamers, under-reamers, fishing tools, steering elements, MWD tools, LWD tools, seismic sources, seismic receivers, pumps, perforators, packers, other tools with an explosive charge, mud-pulse sirens. Downhole LWD Tools may be located in the bottom hole assembly 37 or along the length of the downhole tool string 31. The tools may be inductive resistivity tools 35, sensors, drill bits, motors, hammers, steering elements, links, jars, seismic sources, seismic receivers, sensors, and other tools that aid in the operations of the downhole tool string 31. Different sensors are useful downhole such as pressure sensors, temperature sensors, inclinometers, thermocouplers, accelerometers, and imaging devices.

Preferably the downhole tool string 31 is a drill string. In other embodiments the downhole tool string 31 is part of a production well. In the present embodiment, an embodiment of a resistivity tool 35 in accordance with the present invention is shown producing a magnetic field 30 and projecting the magnetic field 30 through the formation 40. In addition to a resistivity tool 35, the tool string 31 may comprise an acoustic sensor system, hydrophone system, an annular pressure sensor system, formation pressure sensor system, a gamma ray sensor system, density neutron sensor system, a geophone array system, or an accelerometer system, directional drilling system, an inclination sensor system that may include a gyroscopic device, a drilling dynamics system, another system that may be used to evaluate formation properties, an active sensor, a passive sensor, or combinations thereof.

Control equipment may be in communication with the downhole tool string components 36 through an electrically conductive medium. For example, a coaxial cable, wire, twisted pair of wires or combinations thereof may travel from the surface to at least one downhole tool string component. The medium may be in inductive or electrical communication with each other through couplers positioned so as to allow signal transmission across the connection of the downhole component and the tool string. The couplers may be disposed within recesses in either a primary or secondary shoulder of the connection or they may be disposed within inserts positioned within the bores of the drill bit assembly and the downhole tool string component. As the control equipment receives information indicating specific formation qualities, the control equipment may then change drilling parameters according to the data received to optimize drilling efficiency. Operation of the drill string 31 may include the ability to steer the direction of drilling based on the data.

Figure 2:
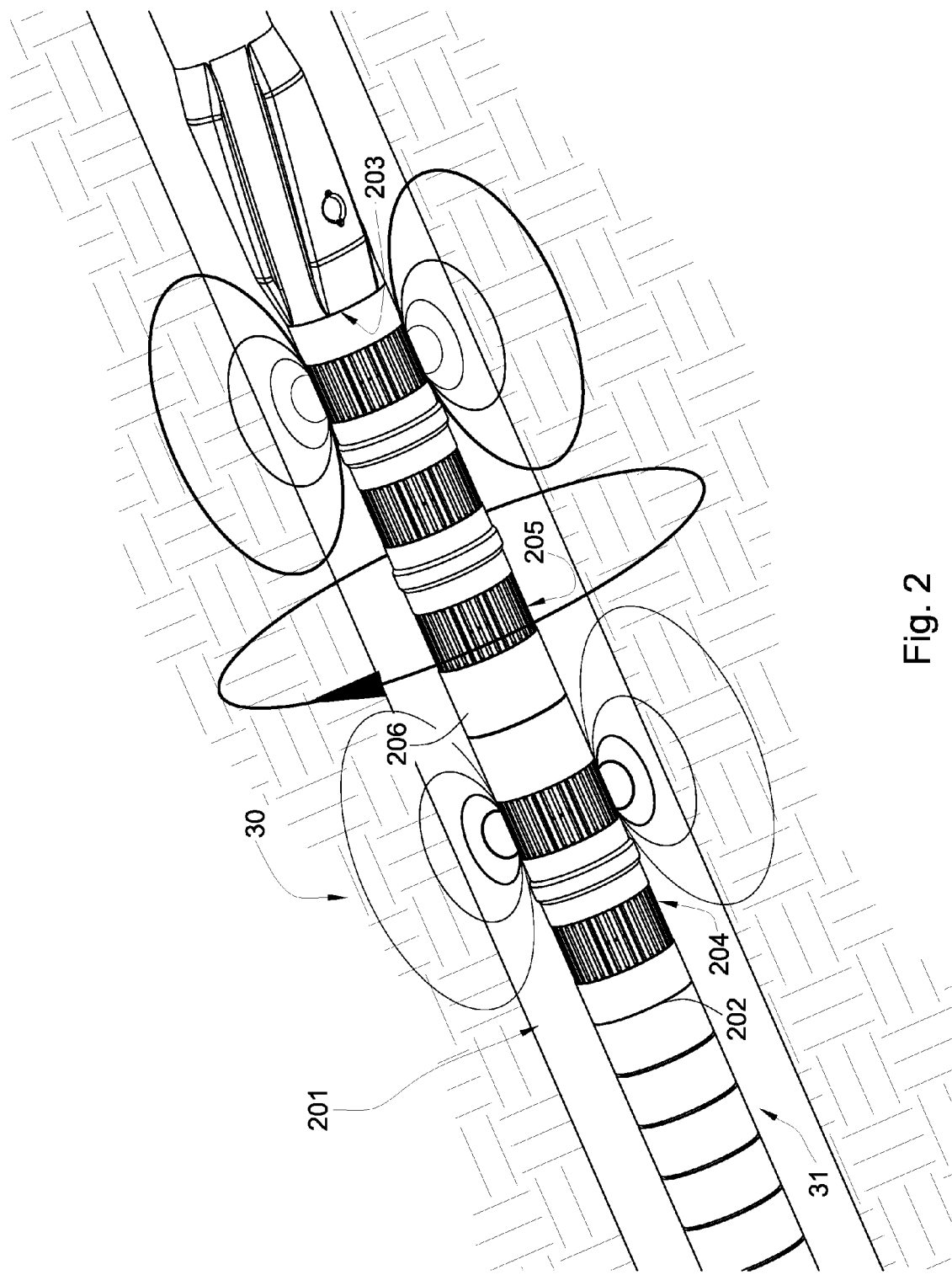
FIG. 2 is a perspective diagram of an embodiment of an inductive resistivity tool.

Referring now to FIG. 2 an embodiment of an inductive resistivity tool 201 is shown as part of a downhole drill string 31. The resistivity tool 201 is shown intermediate first and second tool joints 202, 203. A magnetic field 30 is shown being produced by two transmitting transceivers 204, and being received by three receiving transceivers 205. The magnetic field 30 is induced into the formation, which then in turn induces the receivers 205. By projecting the magnetic field through the formation and comparing the strength of the received signal to that of the transmitted signal, the resistivity of the formation may be determined. Because high resistivity is believed to have a direct correlation with a high concentration of hydrocarbon and/or petroleum products in the formation, resistivity measurements may be used to determine the petroleum potential of a formation during the drilling process. A sleeve 206 may be disposed around the components of the resistivity tool 201 to protect them from mud and/or debris. Although specific numbers of receiving and transmitting transceivers 205, 204 have been shown in the present embodiment, any combination of any number of receiving and transmitting transceivers 205, 204 may be consistent with the present invention.

Figure 3:
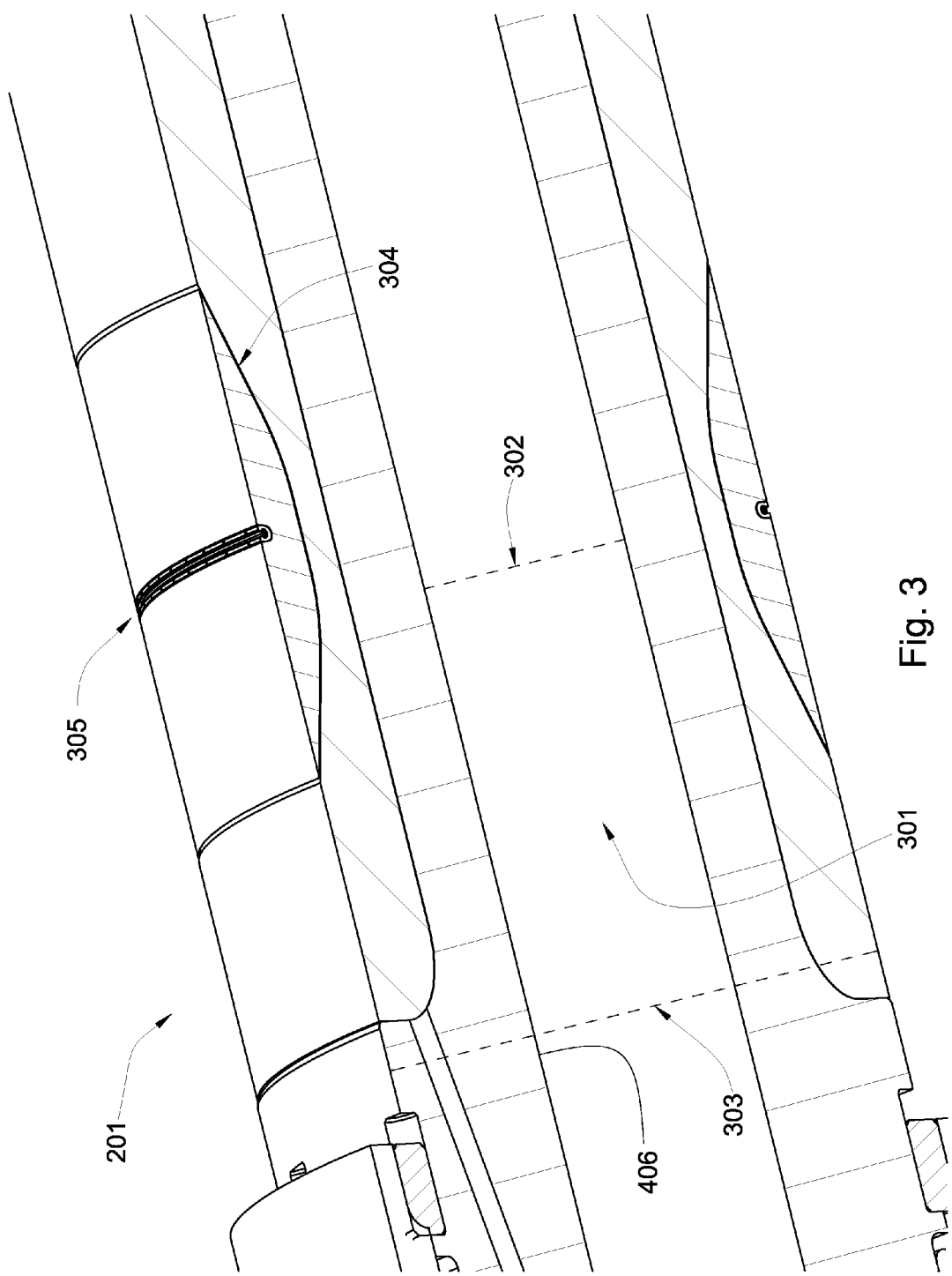
FIG. 3 is a cross-sectional diagram of an embodiment of a transceiver in an inductive resistivity tool.

Referring now to FIG. 3, a cross sectional view of an embodiment of a portion of a resistivity tool 201 is shown without a sleeve 206. A central bore 301 is disclosed through which drilling mud may be transferred. The central bore 301 is formed within a tubular wall comprising an inner diameter 302 and an outer diameter 303. An annular radial recess 304 is shown formed in the outer diameter 303. A coil 305 is placed within the radial recess 304 and may act as a transceiver to project induction signals outward from the resistivity tool 201.

Figure 4:
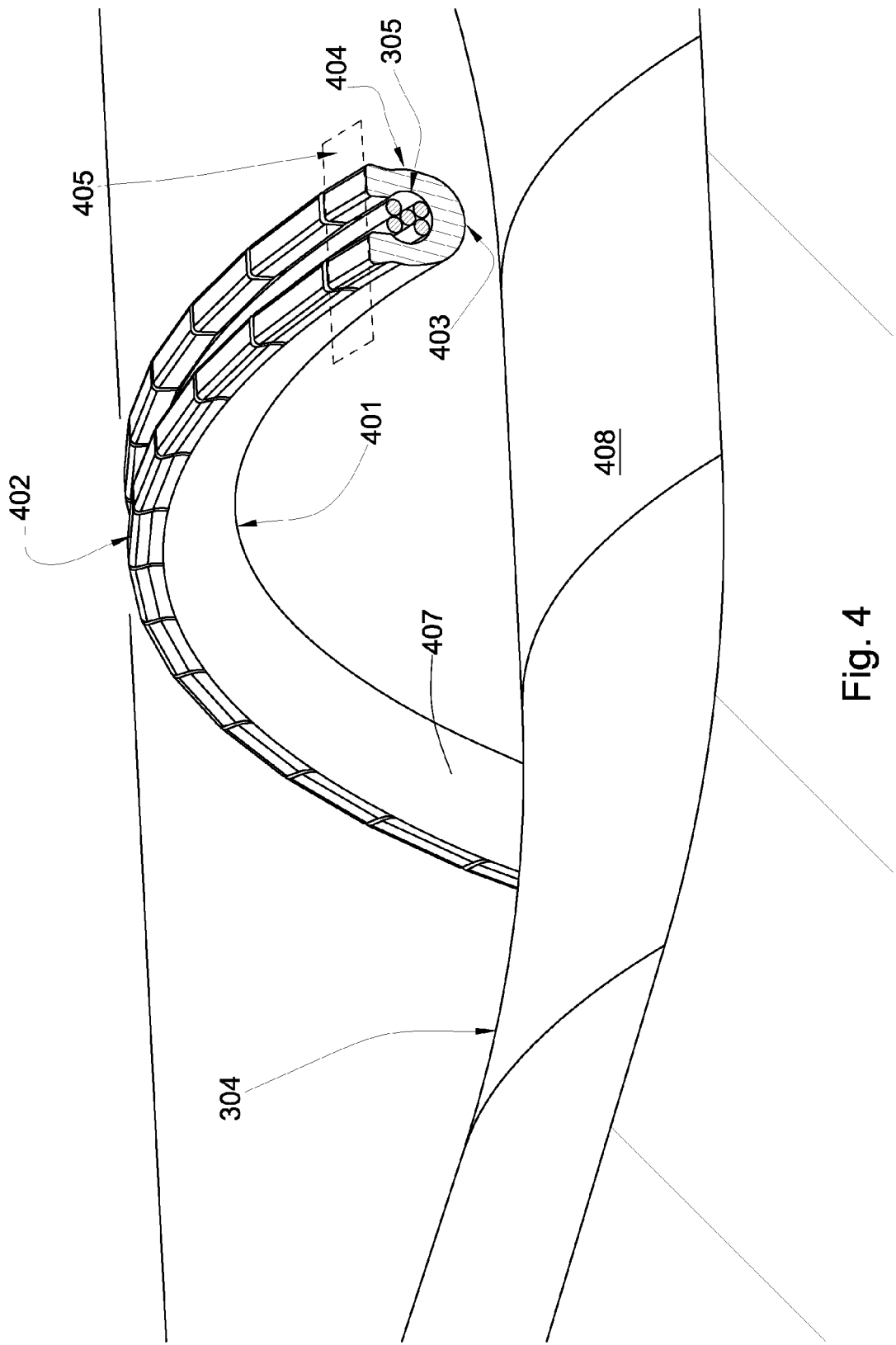
FIG. 4 is a perspective diagram of an embodiment of a coil disposed in an embodiment of a flexible ring.

Referring now to FIG. 4, an enlarged embodiment of a coil 305 is shown disposed in a radial recess 304. Although in the present embodiment of the invention five turns of coil 305 are shown, any number of turns of coil 305 may be compatible with the invention. An embodiment of a flexible ring of magnetically conducting material 401 is shown disposed intermediate the coil 305 and a surface 408 of the radial recess 304. As electrical current is passed through the coil 305 a magnetic field or induction signal may be generated. The placement around the coil 305 of magnetically conducting material, or in other words, material with a high magnetic permeability, is believed to filter the range of frequencies of the induction signal. Ferrite is a compound known to have a high magnetic permeability. Unfortunately, ferrite is also known to be quite brittle and susceptible to cracking and breaking. This may be especially true in the extreme temperature and pressure conditions that exist in downhole environments. Cracks in the magnetically conducting material that are normal to the direction of travel of the magnetic field of coil are believed to be most disruptive to the projection of an inductive signal. In order to take advantage of the high magnetic permeability of ferrite while reducing the risk of cracking the brittle material, a flexible assembly of ferrite segments is formed in the shape of a ring. Flexible rings 401 may be advantageous for ease of production and assembly of the resistivity toot In the present embodiment of the invention, the flexible ring 401 comprises a plurality of ferrite segments 402 that are flexibly joined together with a flexible adhesive backing 407. Although in this embodiment a flexible adhesive backing 407 is shown, other embodiments of flexible backing are encompassed within the claims of this application. Additionally, adjacent ferrite segments 402 may be connected by the use of an adhesive, moldings, form, brace, hinge, tie, string, tape, or combinations thereof.

In the present embodiment a flexible ring 401 is shown comprising a generally circular trough. The circular trough comprises a bottom end 403, two sides 404 and an open end defined by a plane 405 comprising a distal end of each of the sides. In some embodiments of the invention the plane 405 of the open end may be generally parallel to a longitudinal surface 406 of the inner diameter 302 of the tubular wall (see FIG. 3). In other embodiments the plane 405 of the open end forms an angle of between 1 and 89 degrees with a longitudinal surface of the inner diameter of the tubular wall. In some embodiments of the invention the radial recess 304 may comprise at least two flexible rings tilted at different angles. Although in the present embodiment a generally circular trough is shown, embodiments of the invention may comprise a flexible ring with a generally circular trough geometry, a generally cylindrical geometry, a dual trough geometry, or combinations thereof. The flexible ring may comprise a material selected from the group consisting of soft iron, ferrite, a nickel alloy, a silicon iron alloy, a cobalt iron alloy, a mu-metal, a laminated mu-metal, barium, strontium, carbonate, samarium, cobalt, neodymium, boron, a metal oxide, ceramics, cermets, ceramic composites, rare earth metals, an aerogel composite, polymers, organic materials, thermoset polymers, vinyl, a synthetic binder, thermoplastic polymers, an epoxy, natural rubber, fiberglass, carbon fiber composite, polyurethane, silicon, a fluorinated polymer, grease, epoxy, polytetrafluoroethylene, a perfluororoalkoxy compound, resin, potting material, and combinations thereof. The magnetically conductive material may comprise a relative magnetic permeability range of between 100 and 20000. In some embodiments of the invention the magnetically conductive material may comprise ferrite in the form of fibers, strips, shavings, powder, crystals, or combinations thereof.

Figure 5:
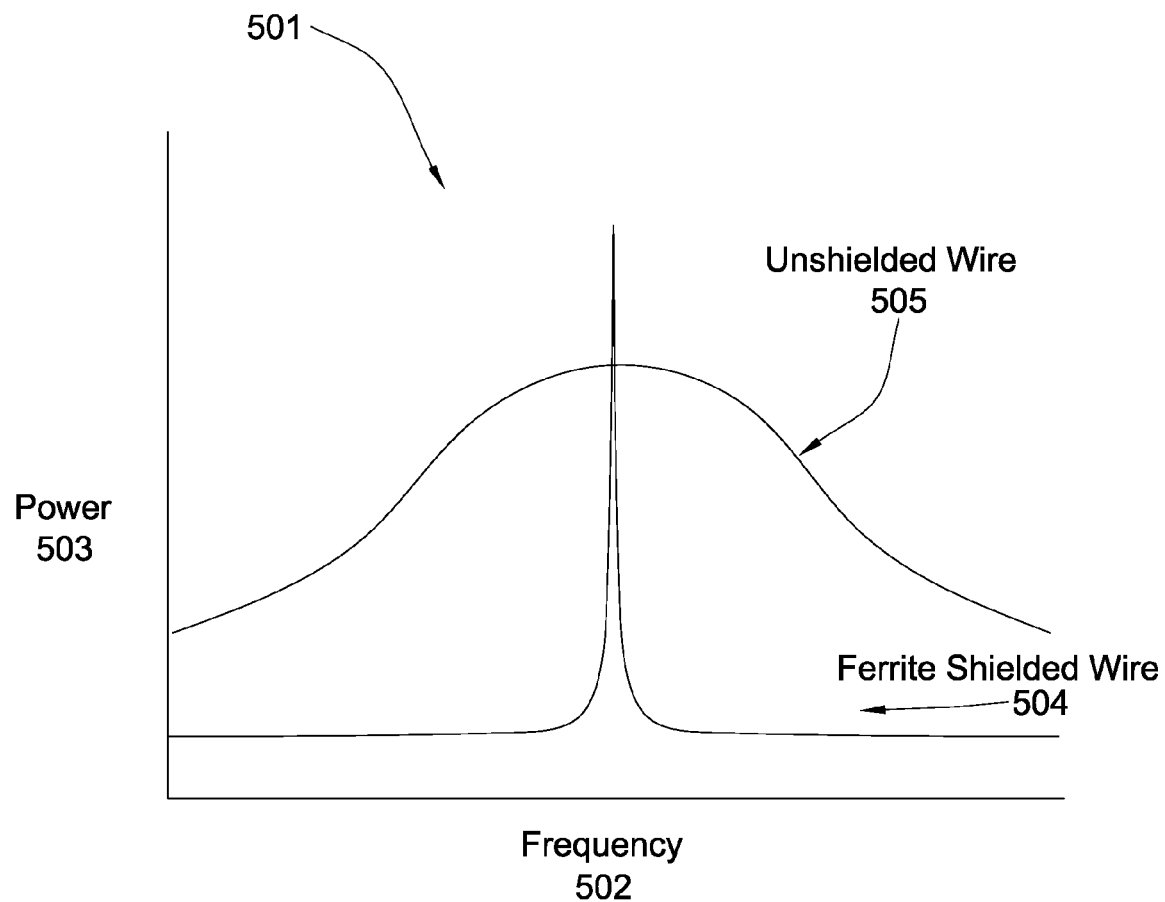
FIG. 5 is a diagram of power verses frequency in a bare wire and in a ferrite shielded wire.

Referring now to FIG. 5, an embodiment of a plot 501 of signal frequency 502 verses power 503 is shown for a ferrite shielded wire 504 compared to a non-shielded wire 505. The plot of the non-shielded wire 505 shows elevated power 503 for a broad range of frequencies 502. The plot of the ferrite shielded wire 504 shows an elevated power 503 for a more narrow range of frequencies 502, and higher maximum power 503 than the bare wire. This property of electromagnetic signals in wire shielded by ferrite or by other magnetically conducting materials is believed to sacrifice frequency range for a higher power intensity, or stronger signal. Strong signals may be important for transmission and receiving signals in downhole environments.

Figure 6:
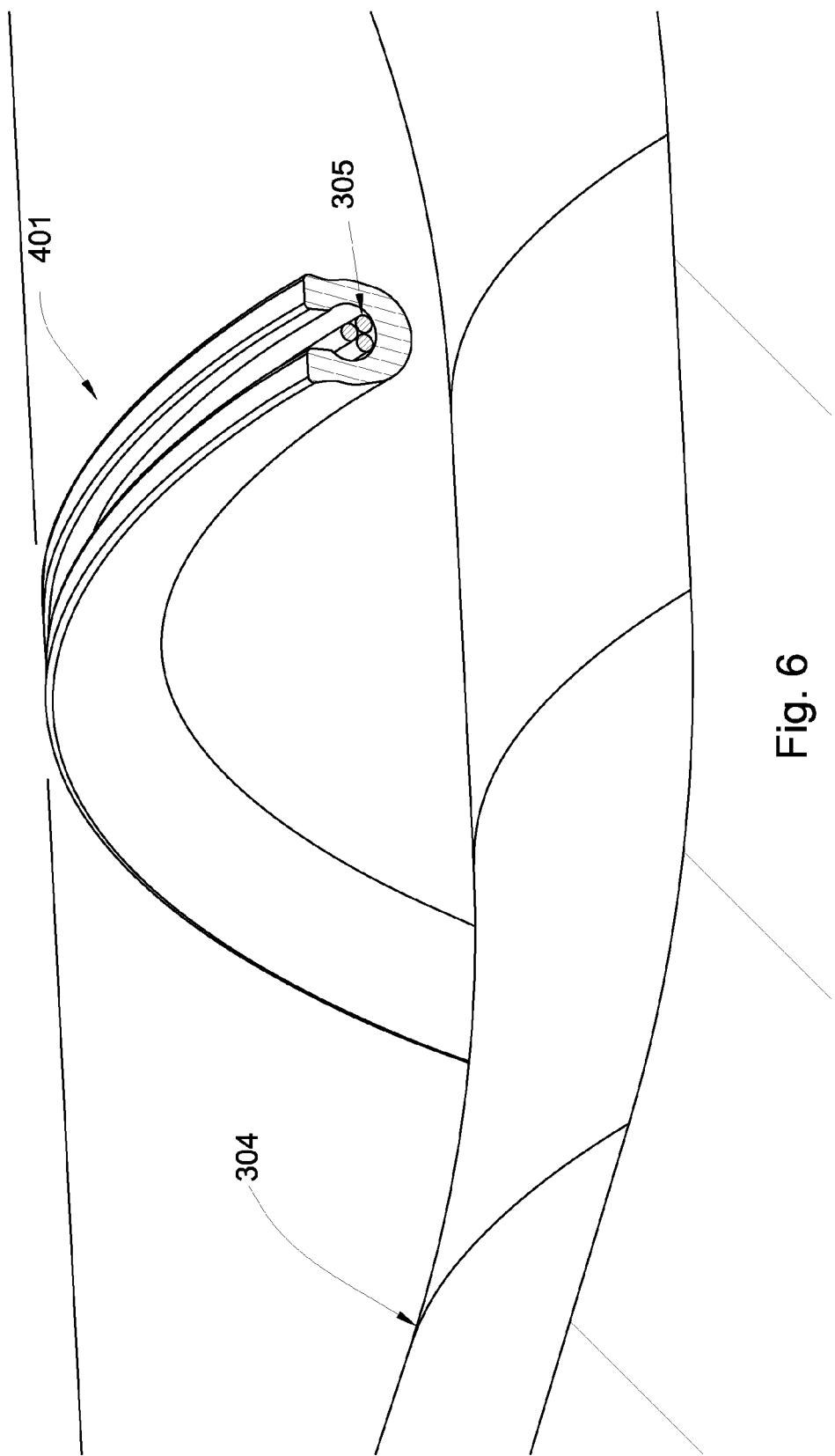
FIG. 6 is a perspective diagram of another embodiment of a coil disposed in another embodiment of a flexible ring.

Referring now to FIG. 6, another embodiment of a flexible ring of magnetically conductive material 401 is shown disposed around three coil turns. The flexible ring 401 is disposed within the radial recess 304 and comprises one continuous and flexible piece of magnetically conductive material. The trough comprises magnetically conductive fibers and/or powders in conjunction with a matrix material to give flexibility to the magnetically conductive material. U.S. Pat. No. 4,278,556 to Tada, which is herein incorporated by reference for all that it contains, discloses a procedure for producing flexible magnets, including pulverizing ferrite particles for use in the production of flexible magnets. U.S. Pat. No. 6,259,030 to Tanigawa et al., U.S. Pat. No. 6,915,701 to Tarler, U.S. Pat. No. 6,849,195 to Basheer et al., U.S. Pat. No. 4,881,988 to Bonser, and US Publication No. 2006/0208383 to Aisenbrey, all of which are herein incorporated by reference for all that they contain, disclose methods of producing and/or examples of flexible magnets adaptable for use in electromagnetic applications. Magnetic particles may be compatible with the present invention, including, ferrite in the form of fibers, strips, shavings, powder, crystals, or combinations thereof. A continuous piece of flexible magnetically conductive material may be less susceptible to cracking or breakage from downhole stresses, as well as during production and assembly of the induction toot In some embodiments of the invention the flexible ring may comprise two or more flexibly attached segments. These flexibly attached segments may be adapted to allow the flexible ring to open and close. This may be especially useful during the process of assembling the resistivity tool.

Figure 7:
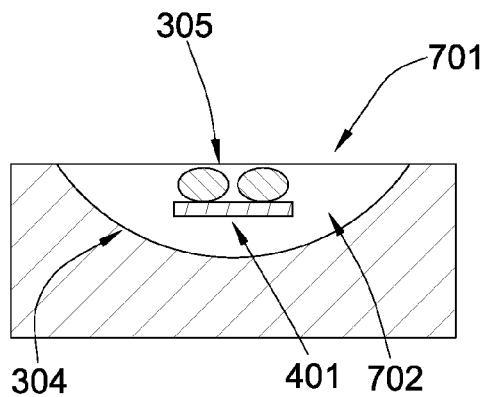
FIG. 7 is a cross-sectional diagram an embodiment of a coil disposed in an embodiment of an annular recess.

FIGS. 7-12 are all cross sectional diagrams of embodiments of coils 305 disposed in various arrangements within the radial recess 304. FIG. 7 discloses two coil turns near an open end 701 of a radial recess 304. A flexible ring of magnetically conductive material 401 is disposed under the coil 305, and comprises a generally cylindrical geometry. Open space between the turns of the coil 305 and the radial recess 304 may be filled with a potting material 702. The potting material may comprise a material selected from the group consisting of polymers, organic materials, thermoset polymers, vinyl, an aerogel composite, a synthetic binder, thermoplastic polymers, an epoxy, natural rubber, fiberglass, carbon fiber composite, polyurethane, silicon, a fluorinated polymer, grease, polytetrafluoroethylene, a perfluororoalkoxy compound, resin, soft iron, ferrite, a nickel alloy, a silicon iron alloy, a cobalt iron alloy, a mu-metal, a laminated mu-metal, barium, strontium, carbonate, samarium, cobalt, neodymium, boron, a metal oxide, ceramics, cermets, ceramic composites, rare earth metals, and combinations thereof.

Figure 8:
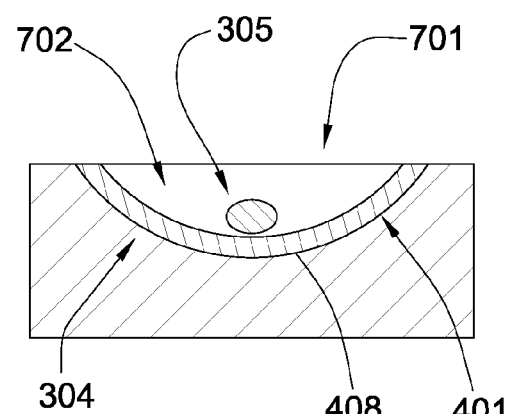
FIG. 8 is a cross-sectional diagram another embodiment of a coil disposed in an embodiment of an annular recess.
Figure 9:
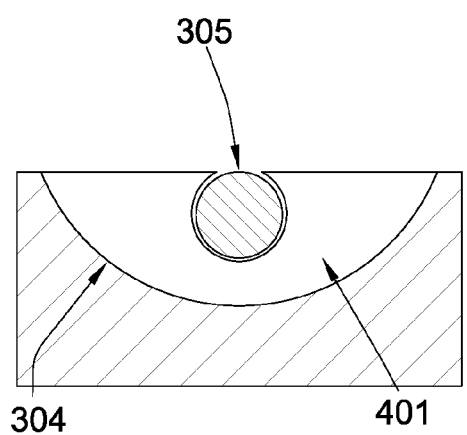
FIG. 9 is a cross-sectional diagram another embodiment of a coil disposed in an embodiment of an annular recess.
Figure 10:
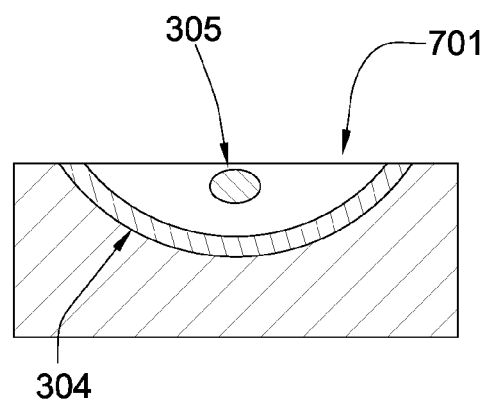
FIG. 10 is a cross-sectional diagram another embodiment of a coil disposed in an embodiment of an annular recess.
Figure 11:
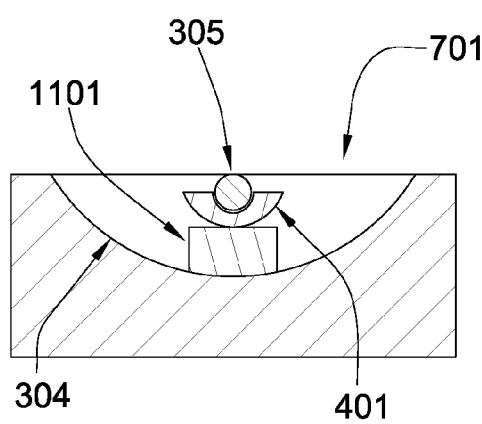
FIG. 11 is a cross-sectional diagram another embodiment of a coil disposed in an embodiment of an annular recess.

FIG. 8 discloses an embodiment of a coil 305 disposed far from the open end 701 of the recess 304 close to a flexible ring of magnetically conducting material 401 in the shape of a trough, which trough is in contact with an inside surface 408 of the radial recess 304. A potting material 702 may fill the rest of the recess 304 and hold the coil 305 in place. FIG. 10 shows an embodiment of the invention similar to that shown in FIG. 8, except that the coil 305 is disposed nearer to the open end 701. FIG. 9 shows an embodiment of the invention in which the flexible ring 401 comprises a flexible potting material that holds the coil 305 in place and together they fill the entirety of the radial recess 304. In such an embodiment the flexible potting material comprises a magnetically conductive material such as ferrite or iron powder or shavings. FIG. 11 discloses an embodiment in which the flexible ring 401 holds the coil 305 in place and both are disposed near the open end 701 of the radial recess 304. In this embodiment an insulating material 1101 separates the flexible ring 401 and the coil 305 from the surface 408 of the radial recess 304. The insulating 1101 material may be a polyetheretherkeytone, another material, or combinations thereof.

Figure 12:
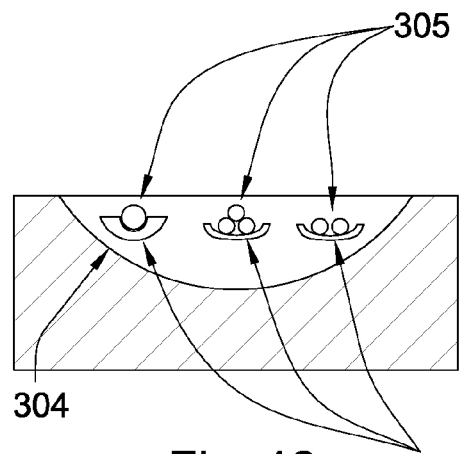
FIG. 12 is a cross-sectional diagram another embodiment of a coil disposed in an embodiment of an annular recess.

Referring now to FIG. 12, a single radial recess 304 may comprise a plurality of flexible rings 401. Each flexible ring 401 may comprise a coil 305 with the same or a different number of turns as the coils 305 in the other flexible rings 401. The coil 305 in each ring 401 may be the same coil 305 or a different coil 305. The coil or plurality of coils 305 in the plurality of rings 401 may be energized independently. Although specific orientations and/or placements of coil 305, flexible ring 401 and radial recess 304 have been shown, this may not be construed to exclude other possible orientations, arrangements or combinations from being included within the scope of the claims of the present invention. These rings may be electrically and/or magnetically isolated from each other. This may be accomplished by spacers between them. In some embodiments, the radial recess may formed in such a way to shield the rings from each other.

Figure 13:
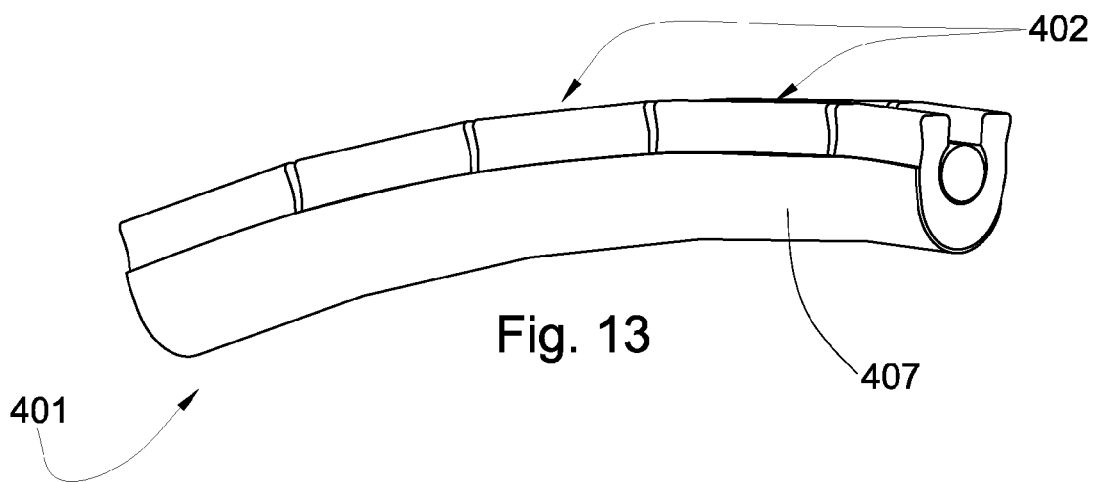
FIG. 13 is a perspective diagram of an embodiment of a flexible ring.
Figure 14:
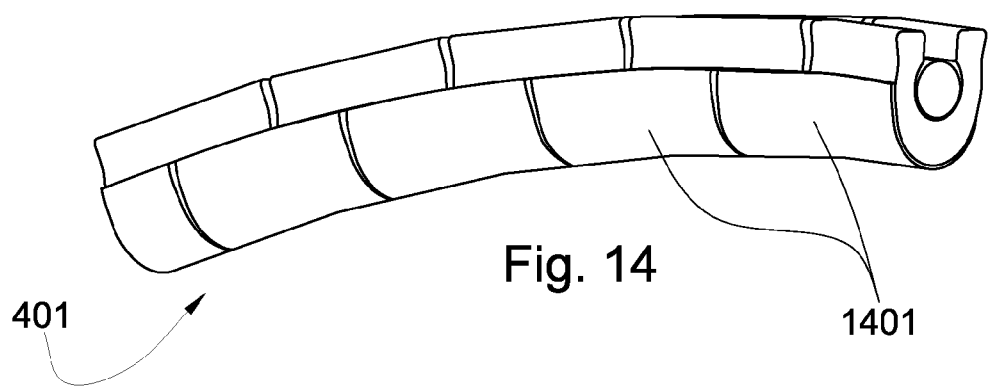
FIG. 14 is a perspective diagram of another embodiment of a flexible ring.
Figure 15:
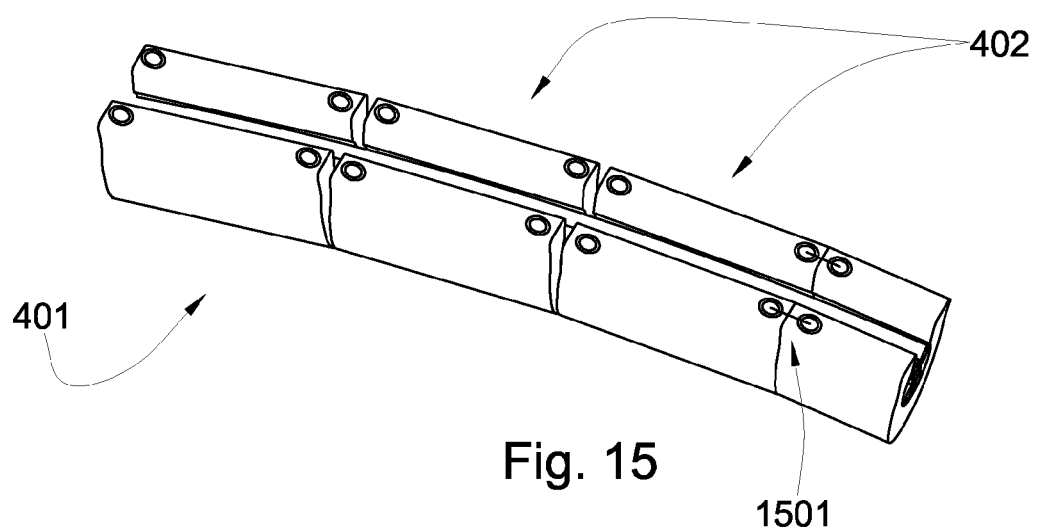
FIG. 15 is a perspective diagram of another embodiment of a flexible ring.

FIGS. 13-16 are perspective diagrams of various embodiments of flexible rings 401 comprising ferrite segments 402 joined flexibly together. FIG. 13 discloses adjacent ferrite segments 402 joined together by a flexible backing 407. In this embodiment of the invention the flexible backing 407 comprises a single piece around multiple segments of the ring 401. The flexible backing may comprise an adhesive, a tape, a string, or combinations thereof. Referring now to FIG. 14, another embodiment of a flexible backing 407 is disclosed, in which the backing connects two segments together. In this embodiment flexible backing segments 1401 are shown. Flexible backing segments 1401 may be advantageous for ease of assembly and disassembly of the ring 401. Flexible backing segments 1401 may comprise a tape, an adhesive, or other components. Referring now to FIG. 15, an embodiment of a flexible ring 401 is shown in which adjacent ferrite segments 402 are joined flexibly together using a string 1501. In some embodiments of the invention a hinge may connect adjacent segments 402. In other embodiments the ferrite segments may be profiled such that the ends of the ferrite segments may be angled such that they are complimentary to each other as they form a ring. In this manner gaps between the segments may be reduced. In some embodiments, the ferrite powder or other magnetically conductive material may be packed into the gaps to prevent magnetic leakage.

Figure 16:
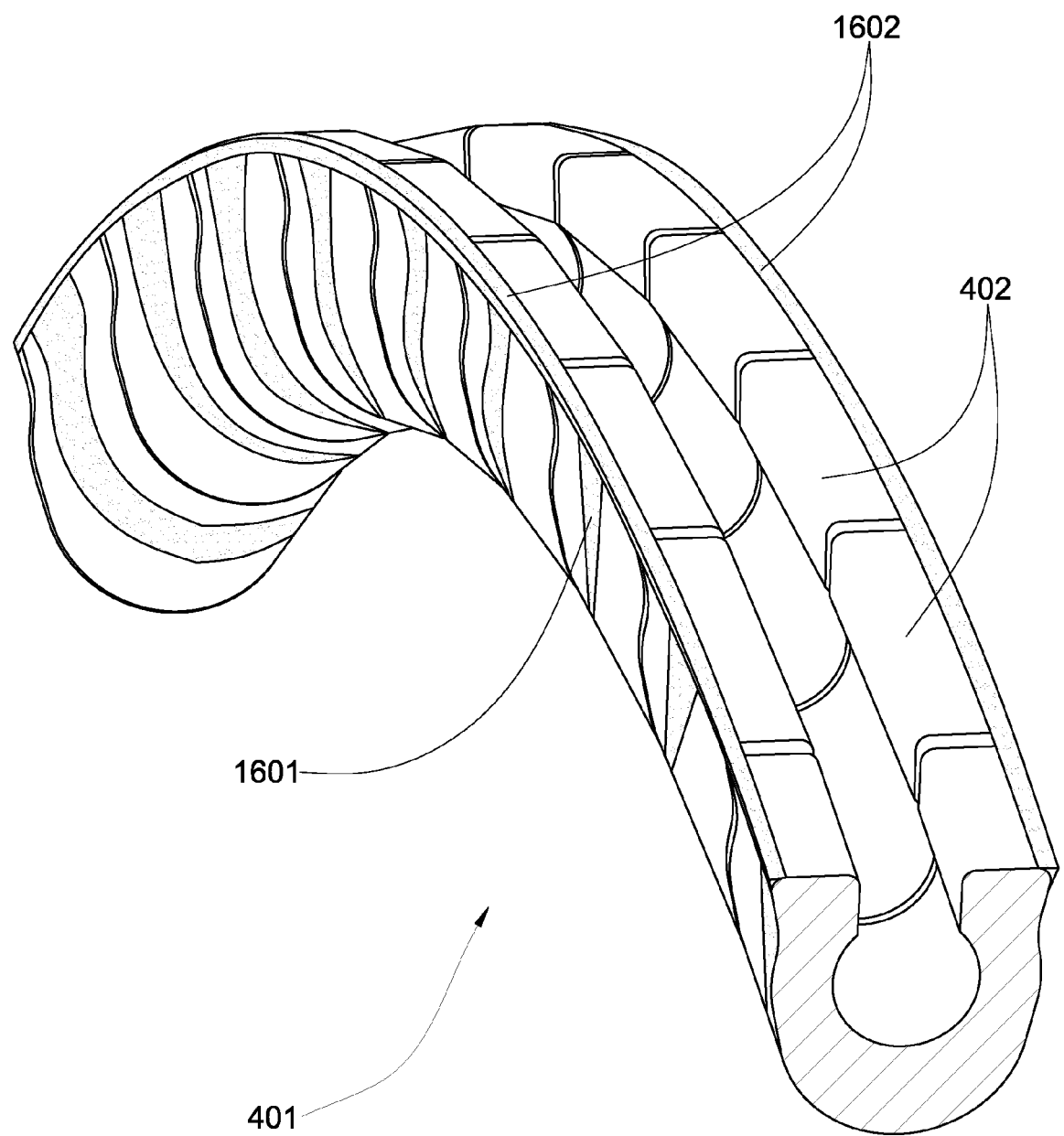
FIG. 16 is a perspective diagram of another embodiment of a flexible ring.

Referring now to FIG. 16, an embodiment of a flexible ring 401 is shown in which segments of ferrite 402 are joined flexibly together using a frame or a brace 1601. The brace 1601 may comprise a rigid though somewhat flexible material such that each of the two sides 1602 may move laterally apart, in order that a ferrite segment 402 may be slid into place. Once the ferrite segment 402 is in place the sides 1602 of the brace 1601 may return to their original position and hold the segment 402 in place. Although a specific embodiment of a brace 1601 has been shown, this may not be construed to suggest that other embodiments of braces 1601 or other such form creating structures are not also consistent with the invention.

Whereas the present invention has been described in particular relation to the drawings attached hereto, it should be understood that other and further modifications apart from those shown or suggested herein, may be made within the scope and spirit of the present invention.

What is claimed is:

1. An induction resistivity tool incorporated into a downhole tool string, comprising:
a downhole tool string component comprising a mid-body intermediate first and second tool joints adapted for connection to adjacent tool string components;
the mid-body comprises a central bore formed within a tubular wall of the component, the tubular wall comprising an inner and outer diameter;
at least one annular radial recess is formed in the outer diameter of the mid-body and comprises a coil adapted to transceive induction signals outwardly from the mid-body; and
at least one flexible ring of magnetically conducting material is disposed intermediate the coil and a surface of the annular radial recess and arranged within the recess such that it filters a range of frequencies of the induction signals.

2. The induction resistivity tool of claim 1, wherein the resistivity tool comprises a sleeve adapted to protect the coil, groove, or flexible ring from mud and/or debris.

3. The induction resistivity tool of claim 1, wherein the resistivity tool is incorporated into a bottom hole assembly.

4. The induction resistivity tool of claim 1, wherein the resistivity tool is in communication with a downhole network.

5. The induction resistivity tool of claim 1, wherein the flexible ring of magnetically conducting material comprises segments of ferrite joined flexibly together with a flexible backing.

6. The induction resistivity tool of claim 5, wherein adjacent segments of ferrite are connected by the use of an adhesive, frame, brace, hinge, tie, string, tape, or combinations thereof.

7. The induction resistivity tool of claim 1, wherein the flexible ring comprises a generally circular trough geometry, a generally cylindrical geometry, a generally flat-faced ring geometry, a generally dual trough geometry, or combinations thereof.

8. The induction resistivity tool of claim 7, wherein a segment of the circular trough comprises a bottom end, two sides and an open end defined by a plane comprising a distal end of each of the sides.

9. The induction resistivity tool of claim 8, wherein the plane of the open end is generally parallel to a longitudinal surface of the inner diameter of the tubular wall.

10. The induction resistivity tool of claim 8, wherein the plane of the open end forms an angle of between 1 and 89 degrees with a longitudinal surface of the inner diameter of the tubular wall.

11. The induction resistivity tool of claim 1, wherein the radial recess comprises at least two flexible rings tilted at different angles.

12. The induction resistivity tool of claim 1, wherein the flexible ring comprises a material selected from the group consisting of soft iron, ferrite, a nickel alloy, a silicon iron alloy, a cobalt iron alloy, a mu-metal, a laminated mu-metal, barium, strontium, carbonate, samarium, cobalt, neodymium, boron, a metal oxide, ceramics, cermets, ceramic composites, rare earth metals, an aerogel composite, polymers, organic materials, thermoset polymers, vinyl, a synthetic binder, thermoplastic polymers, an epoxy, natural rubber, fiberglass, carbon fiber composite, polyurethane, silicon, a fluorinated polymer, grease, polytetrafluoroethylene, a perfluororoalkoxy compound, resin, potting material, and combinations thereof.

13. The induction resistivity tool of claim 1, wherein the magnetically conductive material comprises a relative magnetic permeability range of between 100 and 20000.

14. The induction resistivity tool of claim 1, wherein the magnetically conductive material comprises ferrite in the form of fibers, strips, shavings, powder, crystals, or combinations thereof.

15. The induction resistivity tool of claim 1, wherein the coil comprises between 1 and 15 turns of coil.

16. The induction resistivity tool of claim 1, wherein the coil is separated from the outer diameter by insulating material.

17. The induction resistivity tool of claim 1, wherein the flexible ring comprises a flexible matrix filled with a magnetically conductive material.

18. The induction resistivity tool of claim 1, wherein the flexible ring comprises at least two flexibly attached segments that are adapted to allow the flexible ring to open and close.

19. The induction resistivity tool of claim 1, wherein the flexible ring comprises one continuous piece.

20. The induction resistivity tool of claim 1, wherein a plurality of coils in the same radial recess or in a plurality of radial recesses are each independently energized.

* * * * *